US009438510B2

(12) United States Patent
Wei

(10) Patent No.: US 9,438,510 B2
(45) Date of Patent: Sep. 6, 2016

(54) CALCULATING A ROUTE

(71) Applicant: Hangzhou H3C Technologies Co., Ltd., Hangzhou (CN)

(72) Inventor: Zhiguang Wei, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/649,158

(22) PCT Filed: Dec. 10, 2013

(86) PCT No.: PCT/CN2013/088923
§ 371 (c)(1),
(2) Date: Jun. 2, 2015

(87) PCT Pub. No.: WO2014/094557
PCT Pub. Date: Jun. 26, 2014

(65) Prior Publication Data
US 2015/0350058 A1 Dec. 3, 2015

(30) Foreign Application Priority Data
Dec. 21, 2012 (CN) .......................... 2012 1 0562976

(51) Int. Cl.
*G06F 15/173* (2006.01)
*H04L 12/721* (2013.01)
(Continued)

(52) U.S. Cl.
CPC ........... *H04L 45/14* (2013.01); *H04L 12/6418* (2013.01); *H04L 45/02* (2013.01); *H04L 45/52* (2013.01); *H04L 61/251* (2013.01); *H04L 61/6068* (2013.01)

(58) Field of Classification Search
USPC ........ 709/203, 206, 217, 219, 223, 226, 228
See application file for complete search history.

(56) References Cited

U.S. PATENT DOCUMENTS 5,951,649 A * 9/1999 Dobbins ................. H04L 12/46
709/238
7,865,615 B2 * 1/2011 Mirtorabi ............... H04L 12/66
709/242

(Continued)

FOREIGN PATENT DOCUMENTS

CN 1852212 10/2006
CN 102546426 7/2012

OTHER PUBLICATIONS

International Search Report and Written Opinion dated Mar. 20, 2014 issued on PCT Patent Application No. PCT/CN2013/088923 dated Dec. 10, 2013, The State Intellectual Property Office, P.R. China.

(Continued)

*Primary Examiner* — Quang N Nguyen
(74) *Attorney, Agent, or Firm* — Mannava & Kang, P.C.

(57) ABSTRACT

According to an example, in a method for calculating a route, a first network device may add a protocol attribute supported by a link to a link state protocol data unit (LSP) of the first network device according to a protocol attribute supported by a port of the first network device and a protocol attribute supported by a port of a neighbor network device when establishing an adjacency, and may flood the LSP. The first network device may receive a LSP from a neighbor network device, parse a protocol attribute supported by a link contained in the received LSP, record the protocol attribute supported by the link contained in the received LSP in local network topology information, to obtain updated network topology information. And the first network device may calculate a route according to the updated network topology information. A network device and a computing device may calculate a route.

14 Claims, 4 Drawing Sheets

(51) Int. Cl.
  *H04L 29/12* (2006.01)
  *H04L 12/64* (2006.01)
  *H04L 12/781* (2013.01)
  *H04L 12/751* (2013.01)

(56) References Cited

U.S. PATENT DOCUMENTS 8,589,573 B2 * 11/2013 Mirtorabi ............... H04L 45/02
  709/220

2003/0179742 A1  9/2003 Ogier et al.
2004/0006640 A1 * 1/2004 Inderieden ............ H04L 45/52
  709/242
2006/0140136 A1  6/2006 Filsfils et al.
2007/0214275 A1  9/2007 Mirtorabi et al.

OTHER PUBLICATIONS

Extended European Search Report, EP Application No. 13865009.8, Date: May 18, 2016, pp. 1-6.

* cited by examiner

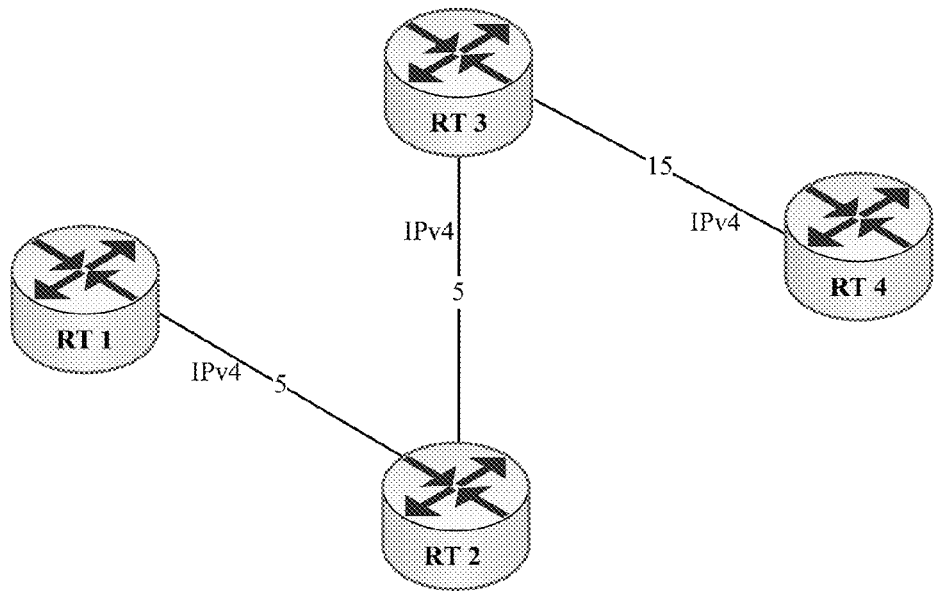

FIG. 3

| When establishing an adjacency, a first network device adds a neighbor TLV to a LSP of the first network device according to a protocol attribute supported by a port of the first network device and a protocol attribute supported by a port of a neighbor network device of the first network device, and floods the LSP. | 501 |

↓

| The first network device receives a LSP from a neighbor network device, parses a neighbor TLV contained in the received LSP to obtain a protocol attribute supported by a link corresponding to the neighbor TLV, records the protocol attribute supported by the link contained in the received LSP in local network topology information according to the protocol attribute supported by the link contained in the received LSP, so as to obtain updated network topology information | 502 |

↓

| The first network device calculates a route according to the updated network topology information | 503 |

FIG. 4

CALCULATING A ROUTE

CLAIM FOR PRIORITY

The present application is a national stage filing under 35 U.S.C. §371 of PCT application number PCT/CN2013/088923, having an international filing date of Dec. 10, 2013, which claims priority to Chinese patent application number 201210562976.9, having a filing date of Dec. 21, 2012, the disclosures of which are hereby incorporated by reference in their entireties.

BACKGROUND

Under an intermediate-system to an intermediate-system (IS-IS) protocol, a link state protocol data unit (LSP) packet is mainly used to notify of topology and routing information. The IS-IS protocol typically calculates a topology based on a shortest path algorithm (e.g., Dijkstra) and performs route calculation for Internet Protocol version 4 (IPv4) or Internet Protocol version 6 (IPv6) according to the calculated topology to direct data packet forwarding. The IS-IS protocol has been used in existing IP networks to support various applications of IPv4 and IPv6. IPv4 address assignment, however, cannot satisfy the requirements of ever-expanding networks and mixed networks of IPv4 and IPv6 have been implemented in some areas. In addition, in various applications, the topology for IPv4 may not be consistent with the topology for IPv6. As such, routing calculation errors often arise in these types of applications because a link supporting IPv4 may be identified as a link supporting IPv6 or vice versa. In other instances, a link supporting IPv4 may be also be identified as a link that supports IPv6.

BRIEF DESCRIPTION OF THE DRAWINGS

Features of the present disclosure are illustrated by way of example and not limited in the following figure(s), in which like numerals indicate like elements, in which:

FIG. 3 is a schematic diagram illustrating a topology of an IPv4 network in accordance with an example of the present disclosure;

FIG. 4 is a flow chart illustrating a method for calculating a route in accordance with an example of the present disclosure;

DETAILED DESCRIPTION

Figure 1:
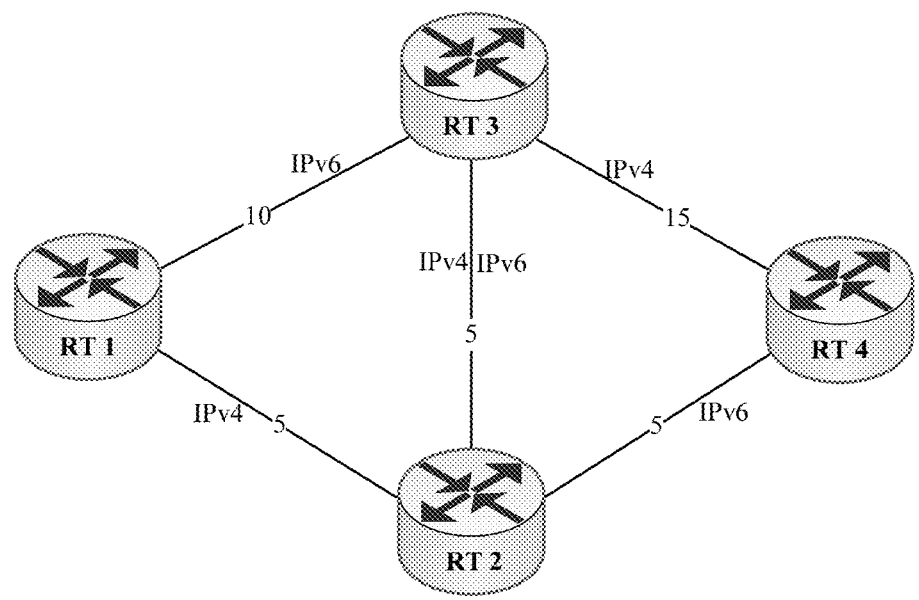
FIG. 1 is a schematic diagram illustrating a topology of a non-symmetrical mixed network of IPv4 and IPv6 in accordance with an example of the present disclosure.

In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

In networks that implement both IPv4 and IPv6, there is often no need to configure both IPv4 and IPv6 for each link applying the IS-IS protocol. That is, when a route for IPv4 or a route for IPv6 is calculated, the network device may not need to determine whether each link in the entire network topology supports IPv4 or IPv6. Therefore, in a process of route calculation, a link supporting IPv4 may be identified as a link supporting IPv6. In addition, a link supporting IPv6 may also be identified as a link supporting IPv4. In this way, the network topology for calculating the route of IPv4 or the route of IPv6 will not be consistent with the actual IPv4 network topology or the actual IPv6 network topology respectively. Thus, routing calculation errors may arise in networks that implement both IPv4 and IPv6.

In an example of the present disclosure, when establishing an adjacency for a first network device, the first network device may add a protocol attribute supported by a link to a link state protocol data unit (LSP) of the first network device according to a protocol attribute supported by a port of the first network device and a protocol attribute supported by a port of a neighbor network device of the first network device. The first network device may also flood the LSP within an IP network. In an example, the first network device may be a network device that requires establishment of an adjacency in the IP network, and the neighbor network device is a network device adjacent to the first network device. For example, the neighbor network device may be directly connected with the first network device.

In an example, the first network device receives a LSP from a neighbor network device, parses the received LSP to obtain a protocol attribute supported by a link contained in the received LSP, and records the protocol attribute supported by the link contained in the received LSP in local network topology information to obtain updated network topology information. Then, the first network device calculates a route according to the updated network topology information.

The protocol attribute supported by the link contained in the flooded LSP may include identifier information that the link contained in the flooded LSP supports Internet Protocol version 4 (IPv4) and/or Internet Protocol version 6 (IPv6). The protocol attribute supported by the link contained in the received LSP may include identifier information that the link contained in the received LSP supports IPv4 and/or IPv6. The protocol attribute supported by the port of the first network device may include identifier information that the link supports IPv4 and/or IPv6. The protocol attribute supported by the port of the neighbor network device may include identifier information that the port of the neighbor network device supports IPv4 and/or IPv6.

In an example of the present disclosure, the first network device may identify the protocol attribute supported by the link when calculating the route by adding the protocol attribute supported by the link to the LSP of the first network device according to the protocol attribute supported by the port of the first network device and the protocol attribute supported by the port of the neighbor network device of the first network device when establishing an adjacency for the first network device, flooding the LSP, receiving the LSP from the neighbor network device, parsing the received LSP to obtain the protocol attribute supported by the link contained in the received LSP, recording the protocol attribute contained in the received LSP in local network topology information to obtain updated network topology information, and calculating a route according to the updated network topology information. For example, the first network device may identify which link supports IPv4, which link supports IPv6, and which link supports both IPv4 and IPv6, so as to guarantee correct routing calculation.

The protocol attribute supported by the link may be added to any information element in the flooded LSP. According to an example of the present disclosure, the protocol attribute supported by the link is added to a neighbor network device type length value (neighbor TLV) in the flooded LSP. The protocol attribute supported by the link may, however, be added to another information element without departing from a scope of the examples discussed above. The following description is made with an example in which the protocol attribute supported by the link is added to the neighbor TLV.

FIG. 4 is a flowchart illustrating a method for calculating a route according to an example. The method may include the following operations:

In block 501, when establishing an adjacency, a first network device may add a neighbor TLV to a LSP of the first network device according to a protocol attribute supported by a port of the first network device and a protocol attribute supported by a port of a neighbor network device of the first network device, and may flood the LSP. The neighbor TLV may include a protocol attribute supported by a link between the port of the first network device and the port of the neighbor network device.

The protocol attribute supported by the link may include identifier information that the link supports IPv4 and/or IPv6. Or, the protocol attribute supported by the port of the first network device may include identifier information that the link supports IPv4 and/or IPv6. Or, the protocol attribute supported by the port of the neighbor network device may include identifier information that the port of the neighbor network device supports IPv4 and/or IPv6.

Before adding the link information to the neighbor TLV, the port of the first network device may perform negotiation with the port of the neighbor network device through a Hello packet. The negotiation may be performed to determine whether both the port of the first network device and the port of the neighbor network device support the same protocol attribute, i.e., IPv4 and/or IPv6. Thus, an adjacency relationship may be established between the port of the first network device and the port of the neighbor network device. The neighbor network device may thus be directly connected to the first network device. In addition, the first network device and the neighbor network device may respectively add the neighbor TLV to LSPs of the first network device and the neighbor network device, in which the LSPs respectively include the protocol attribute supported by the link between the port of the first network device and the port of the neighbor network device.

Therefore, before flooding the neighbor TLV in the LSP, the first network device may have already acquired the protocol attribute supported by the neighbor network device connected to the network device directly through the negotiation. When the LSP of the first network device is flooded and the protocol attribute supported by both the port of the first network device and the port of the neighbor network device includes IPv4, the first network device may add into the LSP, identifier information indicating that the link between the port of the first network device and the port of the neighbor network device supports IPv4 as the protocol attribute. When the LSP of the first network device is flooded and the protocol attribute supported by both the port of the first network device and the port of the neighbor network device includes IPv6, the first network device may add into the LSP, identifier information indicating that the link between the port of the first network device and the port of the neighbor network device supports IPv6 as the protocol attribute. When the LSP of the first network device is flooded and the protocol attribute supported by both the port of the first network device and the port of the neighbor network device includes IPv4 and IPv6, the first network device may add, into the LSP, identifier information indicating that the link between the port of the first network device and the port of the neighbor network device supports IPv4 and IPv6 as the protocol attribute.

For example, as shown in FIG. 1, a first network device (RT2) adds into the LSP, the neighbor TLV from the RT2 to a neighbor network device (RT3). Since both the port of the RT2 and the port of the RT3 support IPv4 and IPv6 at the same time, when the neighbor TLV is added, a format of the neighbor TLV type 22 (TLV22) may be as shown in Table 1.

TABLE 1

1 octet of type (22)
1 octet of length (15)
7 octets of system ID and pseudonode number (C.00)
3 octets of default metric (5)
1 octet of length of sub-TLVs (4)
1 octet of sub-type (19)
1 octet of length of the Value field of the sub-TLV (2)
2 octets of value (0x00 0C) // 0x00 0C represents to support both IPv4 and IPv6.

Table 1 shows the format of TLV22. In accordance with an example of the present disclosure, the identifier indicating that the link between the port of the first network device and the port of the neighbor network device supports IPv4 and/or IPv6 as the information of the protocol attribute may be added into a format sub-TLV19 in the TLV22, i.e., the identifier may be added to "1 octet of sub-type (19)" in Table 1. An example of the format sub-TLV19 may be as shown in Table 2:

TABLE 2

| Value | Name | Reference |
| --- | --- | --- |
| 0x1 | Local Protection Available | [RFC5029] |
| 0x2 | Link Excluded from Local Protection | [RFC5029] |
| 0x4 | Link Support IPv4 Protocol | |
| 0x8 | Link Support IPv6 Protocol | |

As shown in Table 2, "Link Support IPv4 Protocol" and "Link Support IPv6 Protocol" are added to the sub-TLV19 in the TLV22.

With reference back to FIG. 4, in block 502, the first network device may receive a LSP from a neighbor network device, parse a neighbor TLV contained in the received LSP to obtain a protocol attribute supported by a link corresponding to the neighbor TLV, and record the protocol attribute supported by the link contained in the received LSP in local network topology information according to the protocol attribute supported by the link contained in the received LSP, so as to obtain updated network topology information.

The protocol attribute supported by the link contained in the flooded LSP may include identifier information indicating that the link supports IPv4 and/or IPv6.

The first network device may receive the LSP from the neighbor network device. The neighbor network device refers to a neighbor network device that is directly connected to the first network device. The received LSP may include a plurality of neighbor TLVs. For example, as shown in FIG. 1, network device 1 (RT1) receives a LSP transmitted from network device 2 (RT2). The received LSP may include the neighbor TLV directly flooded by RT2 and the neighbor TLV that is flooded by network device 4 (RT4) and forwarded by RT2.

As shown in FIG. 1, when RT2 receives the LSP from network device 3 (RT3), parses the LSP to obtain identifier information of supporting IPv4 and IPv6 by the link between the port of RT2 and the port of RT3.

In detail, RT2 may read the neighbor TLV corresponding to the link between the port of RT2 and the port of RT3 in the received LSP from RT3. A format of TLV22 may be as shown in Table 1. The format sub-TLV19 in the TLV22 may be as shown in Table 2. It can be deduced from "2 octets of value (0x00 0C)" in the last line that C (hexadecimal) in "0x00 00" is 0110 in binary. Based on bit match, 0110 in binary represents "0x8" and "0x4" as shown in Table 2. Thus, "2 octets of value (0x00 0C)" represents that both IPv4 and IPv6 are supported. That is, the link between the port of RT2 and the port of RT3 supports both IPv4 and IPv6 at the same time.

After parsing the neighbor TLV contained in the received LSP to obtain the protocol attribute of the link contained in the received LSP, the following operations may be performed.

If the protocol attribute supported by the link contained in the received LSP indicates that the link supports IPv4, an indication that the link supports IPv4 may be recorded in the network topology information. If the protocol attribute supported by the link contained in the received LSP indicates that the link supports IPv6, an indication that the link supports IPv6 may be recorded in the network topology information. If the protocol attribute supported by the link contained in the received LSP indicates that the link supports both IPv4 and IPv6, an indication that the link supports IPv4 and IPv6 may be recorded in the network topology information.

In detail, the first network device may determine whether the network topology information, before recording the protocol attribute contained in the received LSP, is supported by the link contained in the received LSP. When the network topology information includes the link contained in the received LSP, a protocol attribute previously recorded in the network topology information may be compared with the protocol attribute contained in the received LSP. When the protocol attribute previously recorded in the network topology information is different from the protocol attribute contained in the received LSP, the first network device may modify the protocol attribute previously recorded in the network topology information with the protocol attribute contained in the received LSP. When the network topology information does not include the link contained in the received LSP, the first network device may create the link in the network topology information, and may configure the protocol attribute in the network topology information with the protocol attribute contained in the received LSP.

The protocol attribute for the link contained in the received LSP may be recorded in any of a number of manners, e.g., configuring a Boolean variable for recording.

For example, two Boolean variables may be configured in each link. One of the Boolean variables may be used to record whether the link contained in the received LSP supports IPv4 and the other one of the Boolean variables may be used to record whether the link contained in the received LSP supports IPv4. According to an example, when a Boolean variable is configured as 1, the link contained in the received LSP supports the protocol attribute corresponding to the Boolean variable. In this example, when the Boolean variable is configured as 0, the link contained in the received LSP does not support the protocol attribute corresponding to the Boolean variable. In addition, when the link contained in the received LSP supports both IPv4 and IPv6 at the same time, the two Boolean variables are respectively configured as 1.

Figure 5:
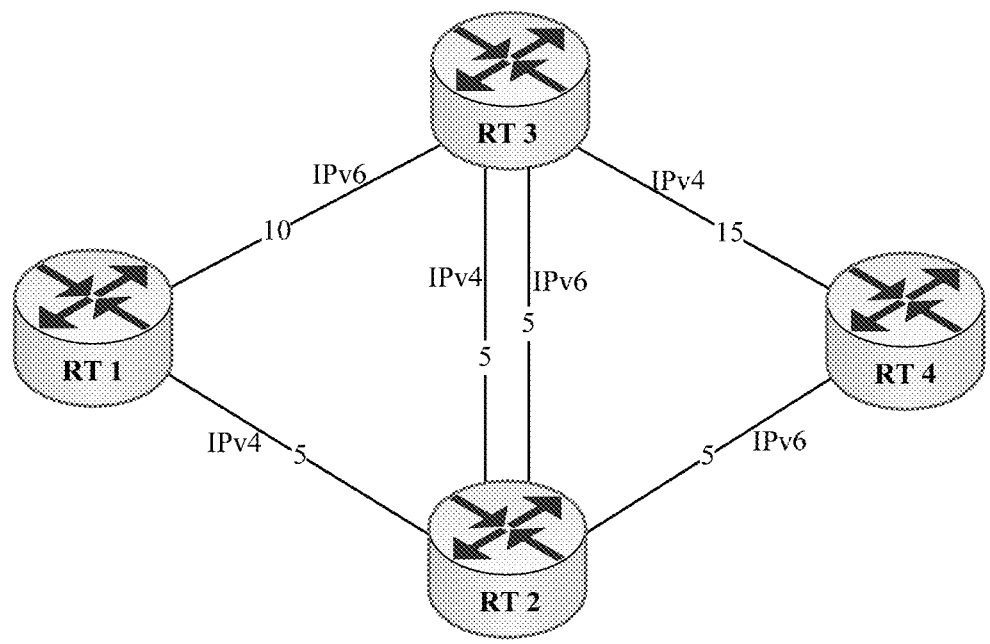
FIG. 5 is a schematic diagram illustrating a recorded topology of a non-symmetrical mixed network of IPv4 and IPv6 in accordance with an example of the present disclosure.

For example, after the network topology information as shown in FIG. 1 is updated, the network topology information of a mixed network of IPv4 and IPv6 is obtained as shown in FIG. 5.

When link 1 between the port of RT1 and the port of RT2 supports IPv4, an indication may be recorded in the network topology information that link 1 supports IPv4. When link 2 between the port of RT1 and the port of RT3 supports IPv6, an indication may be recorded in the network topology information that link 2 supports IPv6. When link 3 between the port of RT2 and the port of RT3 supports both IPv4 and IPv6 at the same time, an indication may be recorded in the network topology information that link 3 supports IPv4 and IPv6.

The protocol attributes respectively supported by the link between the port of RT2 and the port of RT4 and the link between the port of RT3 and the port of RT4 may also respectively be recorded similarly.

With reference back to FIG. 4, in block 503, the first network device may calculate a route according to the updated network topology information. According to an example, the first network device may calculate an IPv4 route according to the updated network topology information of an IPv4 network. The first network device may also calculate an IPv6 route according to the updated network topology information of an IPv6 network.

Following recording of the link indications in the network topology information, although one network topology of the whole network is shown in FIG. 5, the network topology may actually be divided into two network topologies. The two network topologies may include network topologies respectively for an IPv4 network and an IPv6 network, according to the record corresponding to each link in the network topology information.

Figure 2:
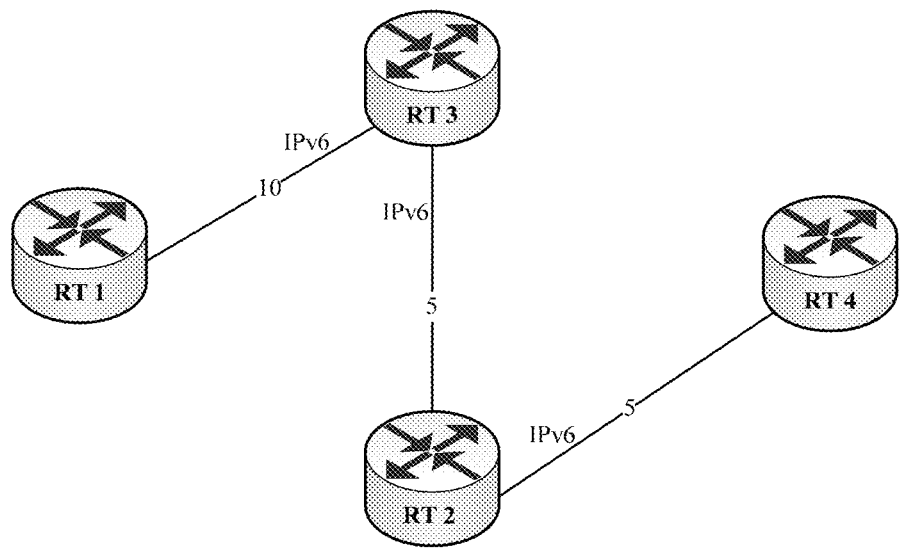
FIG. 2 is a schematic diagram illustrating a topology of an IPv6 network in accordance with an example of the present disclosure.

According to an example, the updated network topology of the IPv6 network is shown in FIG. 2. An IPv6 route may be calculated according to the updated network topology in FIG. 2. An example of the updated network topology of the IPv4 network is shown in FIG. 3. An IPv4 route may be calculated according to the network topology in FIG. 3. Thus, the network topology used for calculating the IPv4 route may be consistent with an actual IPv4 topology, and the network topology used for calculating the IPv6 route may be consistent with an actual IPv6 route, so as to calculate the IPv4 route and the IPv6 route correctly.

Through the record corresponding to each link in the network topology information, the first network device may easily identify the protocol attribute supported by the link. Thus, the first network device may not incorrectly identify a link supporting IPv4 as a link supporting IPv6, and may not incorrectly identify a link supporting IPv6 as a link supporting IPv4.

According to an example, a shortest path algorithm may be used to calculate the IPv4 and IPv6 routes.

Figure 6:
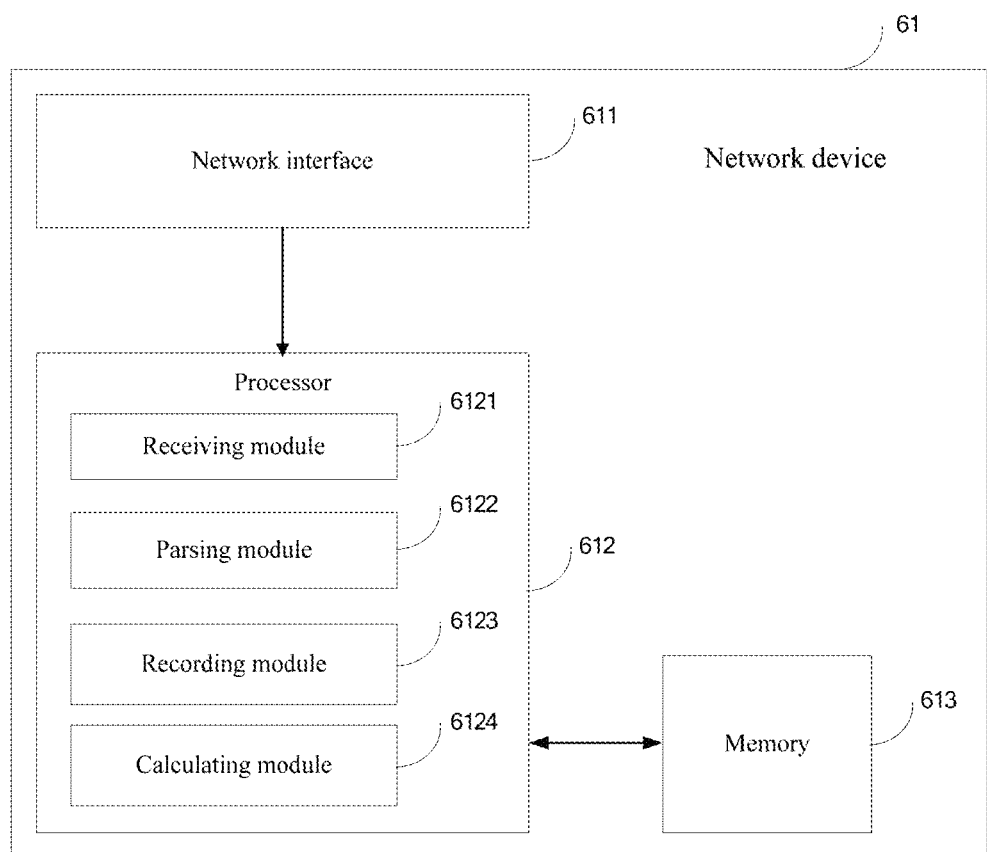
FIG. 6 is a schematic diagram illustrating a structure of a network device in accordance with an example of the present disclosure.

Turning now to FIG. 6, there is shown a structure of a network device according to an example. As shown therein, the network device 61 may include the following components.

A network interface 611 may add a protocol attribute supported by a link to a LSP of the network device 61 according to a protocol attribute supported by a port of the network device 61 and a protocol attribute supported by a port of a neighbor network device of the network device 61 when establishing an adjacency, and may flood the LSP.

The protocol attribute supported by the link may include identifier information indicating that the link supports IPv4 and/or IPv6. The protocol attribute supported by the port of the network device 61 may include identifier information indicating that the port of the network device 61 supports IPv4 and/or IPv6. The protocol attribute supported by the port of the neighbor network device may include identifier information indicating that the port of the neighbor device supports IPv4 and/or IPv6.

The protocol attribute supported by the link may be added to an information element in the LSP. According to an example of the present disclosure, the protocol attribute supported by the link is added to a neighbor network device type length value (neighbor TLV) in the LSP.

Before adding a neighbor TLV, including the protocol attributed supported by the link to the LSP, the network device 61 may perform negotiation with the neighbor network device through a Hello packet to determine whether the ports of the network device 61 and the neighbor network device support the same protocol attribute IPv4 and/or IPv6. Thus, an adjacency may be established between the port of the network device 61 and the port of the neighbor network device. The neighbor network device may be directly connected to the network device 61. In addition, the neighbor TLV, including the protocol attribute supported by the link between the port of the network device 61 and the neighbor network device, may respectively be added to LSPs to be flooded by the network device 61 and the neighbor network device.

A processor 612 may receive a LSP from a neighbor network device through the network interface 611, parse the received LSP to obtain a protocol attribute supported by a link contained in the received LSP, record the protocol attribute supported by the link contained in the received LSP in local network topology information to obtain updated network topology information, and calculate a route according to the updated network topology information. According to an example, in the processor 612, the receiving operation as described above is performed by a receiving module 6121, the parsing operation as described above is performed by a parsing module 6122, the recording operation as described above is performed by a recording module 6123, and the calculating operation as described above is performed by a calculating module 6124.

The protocol attribute contained in the received LSP may include identifier information that indicates whether IPv4 and/or IPv6 is supported.

A memory 613 may store the protocol attribute contained in the received LSP after the processor 612 records the protocol attribute contained in the received LSP.

In detail, the network interface 611 may perform the following operations when establishing adjacency with a neighbor network device. When flooding the neighbor TLV from the network device 61 to the neighbor network device in the LPS of the network device 61 and the protocol attribute supported by both the port of the network device 61 and the port of the neighbor network device includes IPv4, an identifier information indicating that the link between the port of the network device 61 and the port of the neighbor network device includes IPv4 may be added into sub-TLV19 in a TLV22 as the protocol attribute contained in the flooded LSP. When flooding the neighbor TLV from the network device 61 to the neighbor network device and the protocol attribute supported by both the port of the network device 61 and the port of the neighbor network device includes IPv6, an identifier information indicating that the link between the port of the network device 61 and the port of the neighbor network device includes IPv6 may be added to sub-TLV19 in a TLV22 as the protocol attribute contained in the flooded LSP. When flooding the neighbor TLV from the network device 61 to the neighbor network device, and the protocol attribute supported by both the port of the network device 61 and the port of the neighbor network device includes IPv4 and IPv6, an identifier information indicating that the link between the port of the network device 61 and the port of the neighbor network device includes IPv4 and IPv6 may be added to sub-TLV19 in a TLV22 as the protocol attribute contained in the flooded LSP.

The processor 612 may record the protocol attribute supported by the link contained in the received LSP according to the protocol attribute supported by the link contained in the received LSP. If the protocol attribute supported by the link contained in the received LSP indicates that the link supports IPv4, an indication that the link contained in the received LSP supports IPv4 may be recorded in the network topology information. If the protocol attribute supported by the link contained in the received LSP indicates that the link supports IPv6, an indication that the link contained in the received LSP supports IPv6 may be recorded in the network topology information. If the protocol attribute supported by the link contained in the received LSP indicates that the link supports both IPv4 and IPv6 at the same time, an indication that the link contained in the received LSP supports IPv4 and IPv6 may be recorded in the network topology information. In an example, the recording module 6123 is to perform the recording operation above.

The updated network topology information may be obtained by recording the protocol attribute supported by the link contained in the received LSP.

In detail, the processor 612 may determine whether the network topology information, before recording the protocol attribute contained in the received LSP, includes the link contained in the received LSP. When the network topology information includes the link contained in the received LSP, the processor 612 may compare a protocol attribute previously recorded in the network topology information with the protocol attribute contained in the received LSP. When the protocol attribute previously recorded in the network topology information is different from the protocol attribute contained in the received LSP, the processor 612 may modify the protocol attribute previously recorded in the network topology information with the protocol attribute contained in the received LSP. When the network topology information does not include the link contained in the received LSP, the processor 612 may create the link contained in the received LSP in the network topology information, and may configure the protocol attribute in the network topology information with the protocol attribute contained in the received LSP. In an example, the recording module 6123 is to perform the recording operations above.

When calculating an IPv4 and IPv6 route according to the updated network topology information, the processor 612 may calculate an IPv4 route according to the updated network topology information of an IPv4 network. In addition, the processor 612 may calculate an IPv6 route according to the updated network topology information of an IPv6 network. A shortest path algorithm may be used to calculate the IPv4 and IPv6 routes. In an example, the calculating module 6124 is to perform the calculating operations above.

In an example of the present disclosure, a correct result of calculating the route may be guaranteed through use of the recording disclosed herein to distinguish different protocols and calculating the route of a corresponding protocol.

Figure 7:
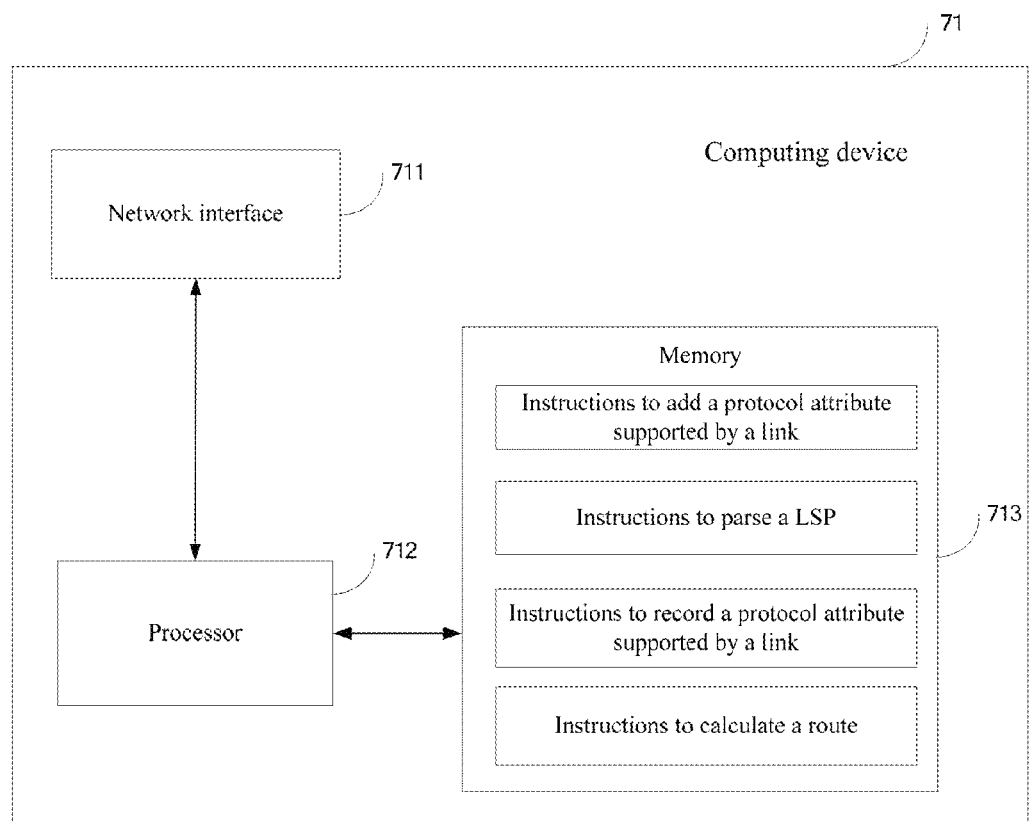
FIG. 7 is a schematic diagram illustrating a structure of a computing device in accordance with an example of the present disclosure.

Turning now to FIG. 7, there is shown a structure of a computing device according to an example. As shown therein, the computing device 71 may include a network interface 711, a processor 712 and a memory 713.

The memory 713 may store machine readable instructions that when executed by the processor 712 cause the processor 712 to: add a protocol attribute supported by a link to a LSP of the computing device 71 according to a protocol attribute supported by a port of the computing device 71 and a protocol attribute supported by a port of a neighbor network device when establishing an adjacency for the first network device, and flood the LSP through the network interface 711. The machine readable instructions are further to cause the processor 712 to receive a LSP from a neighbor network device through the network interface 711, parse the received LSP to obtain a protocol attribute supported by a link contained in the received LSP, and record the protocol attribute contained in the received LSP in local network topology information to obtain updated network topology information. The machine readable instructions are further to cause the processor 712 to calculate a route according to the updated network topology information.

The protocol attribute contained in the flooded LSP may include identifier information that indicates whether IPv4 and/or IPv6 is supported. Or the protocol attribute contained in the received LSP may include identifier information that indicates whether IPv4 and/or IPv6 is supported. Or the protocol attribute supported by the port of the computing device 71 includes identifier information that indicates whether IPv4 and/or IPv6 is supported by the port. Or the protocol attribute supported by the port of the neighbor network device includes identifier information that indicates whether IPv4 and/or IPv6 is supported by the port.

The memory 713 may further store machine readable instructions that when executed by the processor 712 cause the processor 712 to obtain the protocol attribute contained in the flooded LSP by negotiation between the computing device 71 and the neighbor network device through a Hello packet before the computing device 71 adds the protocol attribute to the flooded LSP. The memory 713 may further store machine readable instructions when executed by the processor 712 further cause the processor 712 to, when the protocol attribute supported by both the port of the computing device 71 and the port of the neighbor network device include IPv4, add into the LSP, identifier information indicating that the link between the port of the computing device 71 and the port of the neighbor network device includes IPv4 as the protocol attribute contained in the flooded LSP. The machine readable instructions may further cause the processor 712 to, when the protocol attribute supported by both the port of the computing device 71 and the port of the neighbor network device includes IPv6, add into the LSP, identifier information indicating that the link between the port of the computing device 71 and the port of the neighbor network device includes IPv6 as the protocol attribute contained in the flooded LSP. The machine readable instructions may further cause the processor 712 to, when the protocol attribute supported by both the port of the computing device 71 and the port of the neighbor network device includes IPv4 and IPv6, add into the LSP, identifier information indicating that the link between the port of the computing device 71 and the port of the neighbor network device includes IPv4 and IPv6 as the protocol attribute contained in the flooded LSP.

The memory 713 may store machine readable instructions that when executed by the processor 712 cause the processor 712 to determine whether network topology information, before recording the protocol attribute contained in the received LSP, includes the link contained in the received LSP. When the network topology information includes the link contained in the received LSP, the machine readable instructions may cause the processor 712 to compare a protocol attribute previously recorded in the network topology information with the protocol attribute contained in the received LSP, and modify the protocol attribute previously recorded in the network topology information with the protocol attribute contained in the received LSP when the protocol attribute previously recorded in the network topology information is different from the protocol attribute contained in the received LSP. When the network topology information does not include the link contained in the received LSP, the machine readable instructions may cause the processor 712 to create the link contained in the received LSP in the network topology information and configure the protocol attribute in the network topology information with the protocol attribute contained in the received LSP.

The memory 713 may store machine readable instructions that when executed by the processor 712 cause the processor 712 to: calculate an IPv4 route according to the updated network topology information of an IPv4 network and calculate an IPv6 route according to the updated network topology information of an IPv6 network.

The memory 713 may store machine readable instructions that when executed by the processor 712 cause the processor 712 to use a shortest path algorithm to calculate the route according to the updated network topology information.

The memories depicted in FIGS. 6 and 7 may be any desired computer accessible medium. In addition, the machine readable instructions may include source code, object code, executable code or other formats. Any of the above may be embodied on a non-transitory computer readable storage medium. Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for calculating a route, comprising:
   adding, by a first network device, a protocol attribute supported by a link into a link state protocol data unit (LSP) of the first network device according to a protocol attribute supported by a port of the first network device and a protocol attribute supported by a port of a neighbor network device of the first network device when establishing an adjacency for the first network device;

flooding, by the first network device, the LSP;

receiving, by the first network device, a LSP from a neighbor network device, parsing the received LSP to obtain a protocol attribute supported by a link contained in the received LSP, recording the protocol attribute contained in the received LSP in local network topology information to obtain updated network topology information; and calculating, by the first network device, a route according to the updated network topology information.

2. The method according to claim 1, wherein the protocol attribute contained in the flooded LSP comprises identifier information that indicates whether Internet Protocol version 4 (IPv4) and/or Internet Protocol version 6 (IPv6) is supported;

the protocol attribute contained in the received LSP comprises identifier information that indicates whether IPv4 and/or IPv6 is supported;

the protocol attribute supported by the port of the first network device comprises identifier information that indicates whether IPv4 and/or IPv6 is supported;

the protocol attribute supported by the port of the neighbor network device comprises identifier information that indicates whether IPv4 and/or IPv6 is supported.

3. The method according to claim 1, further comprising:

obtaining, by the first network device, the protocol attribute contained in the flooded LSP by negotiation between the first network device and the neighbor network device through a Hello packet.

4. The method according to claim 2, wherein adding the protocol attribute supported by the link into the LSP of the first network device comprises:

when the protocol attribute supported by both the port of the first network device and the port of the neighbor network device comprises IPv4, adding into the LSP, identifier information indicating that the link between the port of the first network device and the port of the neighbor network device supports IPv4 as the protocol attribute contained in the flooded LSP;

when the protocol attribute supported by both the port of the first network device and the port of the neighbor network device comprises IPv6, adding into the LSP, identifier information indicating that the link between the port of the first network device and the port of the neighbor network device supports IPv6 as the protocol attribute contained in the flooded LSP; and when the protocol attribute supported by both the port of the first network device and the port of the neighbor network device comprises IPv4 and IPv6, adding into the LSP, identifier information indicating that the link between the port of the first network device and the port of the neighbor network device supports IPv4 and IPv6 as the protocol attribute contained in the flooded LSP.

5. The method according to claim 2, wherein recording the protocol attribute contained in the received LSP comprises:

determining whether network topology information, before recording the protocol attribute contained in the received LSP, comprises the link contained in the received LSP;

when the network topology information comprises the link contained in the received LSP, comparing a protocol attribute previously recorded in the network topology information with the protocol attribute contained in the received LSP;

modifying the protocol attribute previously recorded in the network topology information with the protocol attribute contained in the received LSP when the protocol attribute previously recorded in the network topology information is different from the protocol attribute contained in the received LSP; and when the network topology information does not comprise the link contained in the received LSP, creating the link contained in the received LSP in the network topology information, configuring the protocol attribute supported by the link contained in the received LSP in the network topology information with the protocol attribute contained in the received LSP.

6. The method according to claim 2, wherein calculating the route according to the updated network topology information comprises:

calculating an IPv4 route according to the updated network topology information of an IPv4 network; or calculating an IPv6 route according to the updated network topology information of an IPv6 network.

7. The method according to claim 1, wherein calculating the route according to the updated network topology information comprises:

using the shortest path algorithm to calculate the route according to the updated network topology information.

8. A computing device to calculate a route, comprising:

a network interface;

a processor; and a memory storing machine readable instructions that when executed by the processor cause the processor to:

add a protocol attribute supported by a link into a link state protocol data unit (LSP) of a first network device according to a protocol attribute supported by a port of the first network device and a protocol attribute supported by a port of a neighbor network device of the first network device when establishing an adjacency for the first network device;

flood the LSP through the network interface;

receive a LSP from a neighbor network device through the network interface, parse the received LSP to obtain a protocol attribute supported by a link contained in the received LSP, record the protocol attribute contained in the received LSP in local network topology information to obtain updated network topology information; and calculate a route according to the updated network topology information.

9. The computing device according to claim 8, wherein the protocol attribute contained in the flooded LSP comprises identifier information that indicates whether Internet Protocol version 4 (IPv4) and/or Internet Protocol version 6 (IPv6) is supported;

the protocol attribute contained in the received LSP comprises identifier information that indicates whether IPv4 and/or IPv6 is supported;

the protocol attribute supported by the port of the first network device comprises identifier information that indicates whether IPv4 and/or IPv6 is supported; and the protocol attribute supported by the port of the neighbor network device comprises identifier information that indicates whether IPv4 and/or IPv6 is supported.

10. The computing device according to claim 8, wherein the memory further stores machine readable instructions that when executed by the processor further cause the processor to:

obtain the protocol attribute contained in the received LSP by negotiation between the first network device and the neighbor network device through a Hello packet.

11. The computing device according to claim 9, wherein the memory further stores machine readable instructions that when executed by the processor cause the processor to:

when the protocol attribute supported by both the port of the first network device and the port of the neighbor network device comprises IPv4, add into the LSP, identifier information indicating that the link between the port of the first network device and the port of the neighbor network device comprises IPv4 as the protocol attribute contained in the flooded LSP;

when the protocol attribute supported by both the port of the first network device and the port of the neighbor network device comprises IPv6, add into the LSP, identifier information indicating that the link between the port of the first network device and the port of the neighbor network device comprises IPv6 as the protocol attribute contained in the flooded LSP; and when the protocol attribute supported by both the port of the first network device and the port of the neighbor network device comprises IPv4 and IPv6, add into the LSP an identifier information indicating that the link between the port of the first network device and the port of the neighbor network device comprises IPv4 and IPv6 as the protocol attribute contained in the flooded LSP.

12. The computing device according to claim 9, wherein the memory further stores machine readable instructions that when executed by the processor cause the processor to:

determine whether network topology information, before recording the protocol attribute contained in the received LSP, comprises the link contained in the received LSP;

when the network topology information comprises the link contained in the received LSP, compare a protocol attribute previously recorded in the network topology information with the protocol attribute contained in the received LSP;

modify the protocol attribute previously recorded in the network topology information with the protocol attribute contained in the received LSP when the protocol attribute previously recorded in the network topology information is different from the protocol attribute contained in the received LSP; and when the network topology information does not comprise the link contained in the received LSP, create the link contained in the received LSP in the network topology information and configure the protocol attribute contained in the received LSP in the network topology information with the protocol attribute contained in the received LSP.

13. The computing device according to claim 9, wherein the memory further stores machine readable instructions that when executed by the processor cause the processor to:

calculate an IPv4 route according to the updated network topology information of an IPv4 network; or calculate an IPv6 route according to the updated network topology information of an IPv6 network.

14. The computing device according to claim 8, wherein the memory further stores machine readable instructions that when executed by the processor cause the processor to:

use a shortest path algorithm to calculate the route according to the updated network topology information.

* * * * *